(12) United States Patent
Rockel et al.

(10) Patent No.: US 8,116,326 B2
(45) Date of Patent: Feb. 14, 2012

(54) REVENUE MANAGEMENT SYSTEM AND METHOD

(75) Inventors: Alexander Rockel, Quickborn (DE); Jayaprakash Krishnamoorthy, Cupertino, CA (US); David S. Labuda, Palo Alto, CA (US); Jerome Guionnet, Palo Alto, CA (US); David Levy, San Jose, CA (US); Tony Velcich, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1385 days.

(21) Appl. No.: 11/478,558

(22) Filed: Jun. 28, 2006

(65) Prior Publication Data

US 2007/0091874 A1  Apr. 26, 2007

Related U.S. Application Data

(60) Provisional application No. 60/694,743, filed on Jun. 28, 2005, provisional application No. 60/703,687, filed on Jul. 28, 2005.

(51) Int. Cl.
  *H04L 12/28* (2006.01)
(52) U.S. Cl. .......................... 370/401; 455/405; 705/52
(58) Field of Classification Search .................. None
See application file for complete search history.

(56) References Cited

U.S. PATENT DOCUMENTS

| | | | |
|---|---|---|---|
| 4,430,530 A | 2/1984 | Kandell et al. | |
| 4,831,582 A | 5/1989 | Miller et al. | |
| 4,849,884 A | 7/1989 | Axelrod et al. | |
| 4,868,743 A | 9/1989 | Nishio | |
| 4,918,593 A | 4/1990 | Huber | |
| 4,968,873 A | 11/1990 | Dethloff et al. | |
| 5,006,978 A | 4/1991 | Neches | |
| 5,010,485 A | 4/1991 | Bigari | |
| 5,036,389 A | 7/1991 | Morales | |
| 5,043,872 A | 8/1991 | Cheng et al. | |
| 5,163,148 A | 11/1992 | Walls | |
| 5,212,787 A | 5/1993 | Baker et al. | |
| 5,220,501 A | 6/1993 | Lawlor et al. | |
| 5,224,034 A | 6/1993 | Katz et al. | |
| 5,241,670 A | 8/1993 | Eastridge et al. | |
| 5,291,583 A | 3/1994 | Bapat | |
| 5,295,256 A | 3/1994 | Bapat | |
| 5,305,389 A | 4/1994 | Palmer | |
| 5,313,664 A | 5/1994 | Sugiyama et al. | |

(Continued)

FOREIGN PATENT DOCUMENTS

GB        63402 A1    7/1982

(Continued)

OTHER PUBLICATIONS

Agarwal et al., "Architecting Object Applications for High Performance With Relational Databases", Aug. 10, 1995, pp. 1-8.

(Continued)

*Primary Examiner* — Anthony Sol
(74) *Attorney, Agent, or Firm* — Kilpatrick Townsend & Stockton LLP

(57) ABSTRACT

A revenue management system and method for telecommunication network use is disclosed. The revenue management system can be integrated with the internet protocol multimedia subsystem (IMS). The revenue management system and method can have a hardware and/or software revenue generation module or architecture, revenue capture module or architecture, revenue collection module or architecture, revenue analysis module or architecture, or combinations thereof.

16 Claims, 6 Drawing Sheets

U.S. PATENT DOCUMENTS

| | | |
|---|---|---|
| 5,386,413 A | 1/1995 | McAuley et al. |
| 5,426,780 A | 6/1995 | Gerull et al. |
| 5,448,623 A | 9/1995 | Wiedeman et al. |
| 5,448,727 A | 9/1995 | Annevelink |
| 5,450,477 A | 9/1995 | Amarant et al. |
| 5,452,451 A | 9/1995 | Akizawa et al. |
| 5,469,497 A | 11/1995 | Pierce et al. |
| 5,475,585 A | 12/1995 | Bush |
| 5,475,838 A | 12/1995 | Fehskens et al. |
| 5,483,445 A | 1/1996 | Pickering |
| 5,495,609 A | 2/1996 | Scott |
| 5,499,367 A | 3/1996 | Bamford et al. |
| 5,499,371 A | 3/1996 | Henninger et al. |
| 5,504,885 A | 4/1996 | Alashqur |
| 5,506,966 A | 4/1996 | Ban |
| 5,517,555 A | 5/1996 | Amadon et al. |
| 5,523,942 A | 6/1996 | Tyler et al. |
| 5,530,853 A | 6/1996 | Schell et al. |
| 5,544,302 A | 8/1996 | Nguyen |
| 5,548,749 A | 8/1996 | Kroenke et al. |
| 5,555,444 A | 9/1996 | Diekelman |
| 5,560,005 A | 9/1996 | Hoover et al. |
| 5,579,375 A | 11/1996 | Ginter |
| 5,590,395 A | 12/1996 | Diekelman et al. |
| 5,613,012 A | 3/1997 | Hoffman et al. |
| 5,615,109 A | 3/1997 | Eder |
| 5,615,249 A | 3/1997 | Solondz |
| 5,615,362 A | 3/1997 | Jensen et al. |
| 5,627,979 A | 5/1997 | Chang et al. |
| 5,644,736 A | 7/1997 | Healy et al. |
| 5,649,118 A | 7/1997 | Carlisle et al. |
| 5,666,648 A | 9/1997 | Stuart |
| 5,677,945 A | 10/1997 | Mullins et al. |
| 5,684,965 A | 11/1997 | Pickering |
| 5,694,598 A | 12/1997 | Durand et al. |
| 5,706,516 A | 1/1998 | Chang et al. |
| 5,717,924 A | 2/1998 | Kawai |
| 5,732,400 A | 3/1998 | Mandler et al. |
| 5,737,414 A | 4/1998 | Walker et al. |
| 5,745,754 A | 4/1998 | Lagarde et al. |
| 5,765,159 A | 6/1998 | Srinivasan |
| 5,778,189 A | 7/1998 | Kimura et al. |
| 5,797,137 A | 8/1998 | Golshani et al. |
| 5,799,072 A | 8/1998 | Vulcan et al. |
| 5,799,087 A | 8/1998 | Rosen |
| 5,806,061 A | 9/1998 | Chaudhuri et al. |
| 5,809,503 A | 9/1998 | Aoshima |
| 5,822,747 A | 10/1998 | Graefe et al. |
| 5,832,068 A | 11/1998 | Smith |
| 5,842,220 A | 11/1998 | De Groot et al. |
| 5,845,206 A | 12/1998 | Castiel et al. |
| 5,845,274 A | 12/1998 | Chadha et al. |
| 5,850,544 A | 12/1998 | Parvathaneny et al. |
| 5,852,820 A | 12/1998 | Burrows |
| 5,854,835 A | 12/1998 | Montgomery et al. |
| 5,864,845 A | 1/1999 | Voorhees et al. |
| 5,870,473 A | 2/1999 | Boesch et al. |
| 5,870,724 A | 2/1999 | Lawlor et al. |
| 5,873,093 A | 2/1999 | Williamson et al. |
| 5,875,435 A | 2/1999 | Brown |
| 5,883,584 A | 3/1999 | Langemann et al. |
| 5,884,290 A | 3/1999 | Smorodinsky et al. |
| 5,893,108 A | 4/1999 | Srinivasan et al. |
| 5,898,762 A | 4/1999 | Katz |
| 5,909,440 A | 6/1999 | Ferguson et al. |
| 5,913,164 A | 6/1999 | Pawa et al. |
| 5,915,253 A | 6/1999 | Christiansen |
| 5,920,629 A | 7/1999 | Rosen |
| 5,924,094 A | 7/1999 | Sutter |
| 5,937,406 A | 8/1999 | Balabine et al. |
| 5,960,416 A | 9/1999 | Block |
| 5,963,648 A | 10/1999 | Rosen |
| 5,966,649 A | 10/1999 | Gulliford et al. |
| 5,970,417 A | 10/1999 | Toyryla et al. |
| 5,974,407 A | 10/1999 | Sacks |
| 5,974,441 A | 10/1999 | Rogers et al. |
| 5,974,506 A | 10/1999 | Sicola et al. |
| 5,983,223 A | 11/1999 | Perlman |
| 5,987,233 A | 11/1999 | Humphrey |
| 6,005,926 A | 12/1999 | Mashinsky |
| 6,011,795 A | 1/2000 | Varghese et al. |
| 6,012,057 A | 1/2000 | Mayer et al. |
| 6,016,341 A | 1/2000 | Lim |
| 6,021,409 A | 2/2000 | Burrows |
| 6,032,132 A | 2/2000 | Nelson |
| 6,035,326 A | 3/2000 | Miles et al. |
| 6,041,323 A | 3/2000 | Kubota |
| 6,047,067 A | 4/2000 | Rosen |
| 6,047,267 A | 4/2000 | Owens et al. |
| 6,047,284 A | 4/2000 | Owens et al. |
| 6,058,173 A | 5/2000 | Penfield et al. |
| 6,058,375 A | 5/2000 | Park |
| 6,061,679 A | 5/2000 | Bournas et al. |
| 6,061,763 A | 5/2000 | Rubin et al. |
| 6,067,574 A | 5/2000 | Tzeng |
| 6,070,051 A | 5/2000 | Astrom et al. |
| 6,075,796 A | 6/2000 | Katseff et al. |
| 6,078,897 A | 6/2000 | Rubin et al. |
| 6,092,055 A | 7/2000 | Owens et al. |
| 6,112,190 A | 8/2000 | Fletcher et al. |
| 6,112,304 A | 8/2000 | Clawson |
| 6,141,759 A | 10/2000 | Braddy |
| 6,154,765 A | 11/2000 | Hart |
| 6,170,014 B1 | 1/2001 | Darago et al. |
| 6,185,225 B1 | 2/2001 | Proctor |
| 6,185,557 B1 | 2/2001 | Liu |
| 6,223,172 B1 | 4/2001 | Hunter et al. |
| 6,236,972 B1 | 5/2001 | Shkedy |
| 6,236,988 B1 | 5/2001 | Aldred |
| 6,243,760 B1 | 6/2001 | Armbuster et al. |
| 6,266,660 B1 | 7/2001 | Liu et al. |
| 6,311,185 B1 | 10/2001 | Markowitz et al. |
| 6,311,186 B1 | 10/2001 | MeLampy et al. |
| 6,314,365 B1 | 11/2001 | Smith |
| 6,321,205 B1 | 11/2001 | Eder |
| 6,341,272 B1 | 1/2002 | Randle |
| 6,347,340 B1 | 2/2002 | Coelho et al. |
| 6,351,778 B1 | 2/2002 | Orton et al. |
| 6,356,897 B1 | 3/2002 | Gusack |
| 6,377,938 B1 | 4/2002 | Block et al. |
| 6,377,957 B1 | 4/2002 | Jeyaraman |
| 6,381,228 B1 | 4/2002 | Prieto et al. |
| 6,381,605 B1 | 4/2002 | Kothuri et al. |
| 6,381,607 B1 | 4/2002 | Wu et al. |
| 6,400,729 B1 | 6/2002 | Shimadoi et al. |
| 6,400,925 B1 | 6/2002 | Tirabassi et al. |
| 6,401,098 B1 | 6/2002 | Moulin |
| 6,415,323 B1 | 7/2002 | McCanne et al. |
| 6,427,172 B1 | 7/2002 | Thacker et al. |
| 6,429,812 B1 | 8/2002 | Hoffberg |
| 6,442,652 B1 | 8/2002 | Laboy et al. |
| 6,446,068 B1 | 9/2002 | Kortge |
| 6,477,651 B1 | 11/2002 | Teal |
| 6,481,752 B1 | 11/2002 | DeJoseph |
| 6,490,592 B1 | 12/2002 | St. Denis et al. |
| 6,494,367 B1 | 12/2002 | Zacharias |
| 6,529,915 B1 | 3/2003 | Owens et al. |
| 6,532,283 B1 | 3/2003 | Ingram |
| 6,553,336 B1 | 4/2003 | Johnson et al. |
| 6,563,800 B1 | 5/2003 | Salo et al. |
| 6,564,047 B1 | 5/2003 | Steele et al. |
| 6,564,247 B1 | 5/2003 | Todorov |
| 6,567,408 B1 | 5/2003 | Li et al. |
| 6,658,415 B1 | 12/2003 | Brown et al. |
| 6,658,463 B1 | 12/2003 | Dillon et al. |
| 6,662,180 B1 | 12/2003 | Aref et al. |
| 6,662,184 B1 | 12/2003 | Friedberg |
| 6,678,675 B1 | 1/2004 | Rothrock |
| 6,700,869 B1 | 3/2004 | Falco et al. |
| 6,725,052 B1 | 4/2004 | Raith |
| 6,735,631 B1 | 5/2004 | Oehrke et al. |
| 6,901,507 B2 | 5/2005 | Wishneusky |
| 6,907,429 B2 | 6/2005 | Carneal et al. |
| 6,947,440 B2 | 9/2005 | Chatterjee et al. |
| 6,950,867 B1 | 9/2005 | Strohwig et al. |
| 6,973,057 B1 | 12/2005 | Forslow |
| 6,999,569 B2 | 2/2006 | Risafi et al. |

| | | | |
|---|---|---|---|
| 7,003,280 B2 | 2/2006 | Pelaez et al. | |
| 7,089,262 B2 | 8/2006 | Owens et al. | |
| 7,181,537 B2 | 2/2007 | Costa-Requena et al. | |
| 7,233,918 B1 | 6/2007 | Ye et al. | |
| 7,246,102 B2 | 7/2007 | McDaniel et al. | |
| 7,257,611 B1 | 8/2007 | Shankar et al. | |
| 7,391,784 B1 | 6/2008 | Renkel | |
| 7,395,262 B1 | 7/2008 | Rothrock | |
| 7,406,471 B1 | 7/2008 | Shankar et al. | |
| 7,729,925 B2 | 6/2010 | Maritzen et al. | |
| 7,792,714 B1 | 9/2010 | Mills et al. | |
| 2001/0005372 A1 | 6/2001 | Cave et al. | |
| 2001/0025273 A1 | 9/2001 | Walker et al. | |
| 2001/0034704 A1 | 10/2001 | Farhat et al. | |
| 2001/0056362 A1 | 12/2001 | Hanagan et al. | |
| 2002/0059163 A1 | 5/2002 | Smith | |
| 2002/0073082 A1 | 6/2002 | Duviller et al. | |
| 2002/0082881 A1 | 6/2002 | Price et al. | |
| 2002/0087469 A1 | 7/2002 | Ganesan et al. | |
| 2002/0106064 A1 | 8/2002 | Bekkevold et al. | |
| 2003/0014361 A1 | 1/2003 | Klatt et al. | |
| 2003/0014656 A1 | 1/2003 | Ault et al. | |
| 2003/0061537 A1 | 3/2003 | Cha et al. | |
| 2003/0076940 A1 | 4/2003 | Manto | |
| 2003/0078056 A1 | 4/2003 | Takatori et al. | |
| 2003/0097547 A1 | 5/2003 | Wishneusky | |
| 2003/0105799 A1* | 6/2003 | Khan et al. | 709/201 |
| 2003/0118039 A1 | 6/2003 | Nishi et al. | |
| 2003/0133552 A1 | 7/2003 | Pillai et al. | |
| 2003/0172145 A1* | 9/2003 | Nguyen | 709/223 |
| 2003/0202521 A1 | 10/2003 | Havinis et al. | |
| 2003/0202638 A1 | 10/2003 | Eringis et al. | |
| 2004/0002918 A1 | 1/2004 | McCarthy et al. | |
| 2004/0018829 A1 | 1/2004 | Raman et al. | |
| 2004/0062106 A1 | 4/2004 | Ramesh et al. | |
| 2004/0073500 A1 | 4/2004 | Owen et al. | |
| 2004/0132427 A1 | 7/2004 | Lee et al. | |
| 2004/0153407 A1 | 8/2004 | Clubb et al. | |
| 2005/0018689 A1 | 1/2005 | Chudoba | |
| 2005/0026558 A1* | 2/2005 | Stura et al. | 455/3.06 |
| 2005/0033847 A1 | 2/2005 | Roy | |
| 2005/0036487 A1 | 2/2005 | Srikrishna | |
| 2005/0065880 A1 | 3/2005 | Amato et al. | |
| 2005/0075957 A1 | 4/2005 | Pincus et al. | |
| 2005/0091156 A1 | 4/2005 | Hailwood et al. | |
| 2005/0107066 A1 | 5/2005 | Erskine et al. | |
| 2005/0113062 A1* | 5/2005 | Pelaez et al. | 455/405 |
| 2005/0120350 A1* | 6/2005 | Ni et al. | 718/105 |
| 2005/0125305 A1 | 6/2005 | Benco et al. | |
| 2005/0144099 A1 | 6/2005 | Deb et al. | |
| 2005/0187841 A1 | 8/2005 | Grear et al. | |
| 2005/0238154 A1 | 10/2005 | Heaton et al. | |
| 2006/0010057 A1 | 1/2006 | Bradway et al. | |
| 2006/0015363 A1 | 1/2006 | Allu et al. | |
| 2006/0035637 A1* | 2/2006 | Westman | 455/435.3 |
| 2006/0045250 A1* | 3/2006 | Cai et al. | 379/126 |
| 2006/0056607 A1* | 3/2006 | Halkosaari | 379/114.12 |
| 2006/0148446 A1 | 7/2006 | Karlsson | |
| 2006/0168303 A1* | 7/2006 | Oyama et al. | 709/231 |
| 2006/0190478 A1 | 8/2006 | Owens et al. | |
| 2006/0248010 A1 | 11/2006 | Krishnamoorthy et al. | |
| 2006/0251226 A1 | 11/2006 | Hogan et al. | |
| 2007/0091874 A1 | 4/2007 | Rockel | |
| 2007/0100981 A1* | 5/2007 | Adamczyk et al. | 709/223 |
| 2007/0110083 A1 | 5/2007 | Krishnamoorthy et al. | |
| 2007/0133575 A1 | 6/2007 | Cai et al. | |
| 2007/0198283 A1 | 8/2007 | Labuda | |
| 2007/0288367 A1 | 12/2007 | Krishnamoorthy et al. | |
| 2007/0288368 A1 | 12/2007 | Krishnamoorthy et al. | |
| 2008/0033873 A1 | 2/2008 | Krishnamoorthy et al. | |
| 2008/0033874 A1 | 2/2008 | Krishnamoorthy et al. | |
| 2008/0040267 A1 | 2/2008 | Krishnamoorthy et al. | |
| 2008/0126230 A1* | 5/2008 | Bellora et al. | 705/32 |
| 2008/0215474 A1 | 9/2008 | Graham | |
| 2008/0311883 A1* | 12/2008 | Bellora et al. | 455/406 |

FOREIGN PATENT DOCUMENTS

| | | |
|---|---|---|
| WO | WO 95/04960 A2 | 2/1995 |
| WO | WO 95/27255 A1 | 10/1995 |
| WO | WO 96/34350 A1 | 10/1996 |
| WO | WO 97/03406 A1 | 1/1997 |
| WO | WO 98/52131 A1 | 11/1998 |
| WO | WO 2007/002841 A2 | 1/2007 |
| WO | WO 2007/016412 A2 | 2/2007 |

OTHER PUBLICATIONS

Black, "Real-Time Fraud Management", Billing World, Jul./Aug. 1999; pp. 3.

Blaha, Michael R. et al., "Relational Database Design Using an Object Oriented Methodology", Communication of the ACM, Apr. 1988, vol. 31, No. 4, pp. 414-427.

Borland's Paradox for Windows User Guide, Version 5.0, Borland International, Inc., 1994, 185 pages.

Chenho, Kung, "Object Subclass Hierarchy in SQL: A Simple Approach", Jul. 1990, Communications of the ACM, vol. 33, No. 7, pp. 117-125.

Chester, Thomas et al., Mastering Excel 97, 4th Ed., Sybex Inc., Alameda, CA, 1997, 200 pages.

Davis, Charles, "Online Financing to Boost Procurement", Electronic Payments International, p. 14, Feb. 2000, 3 pages total.

Derfler, Frank J. et al., "How Networks Work", Millenium Ed., Que Corporation, Jan. 2000, 249 pages (2 pdf attachments).

Gavron, Jacquelyn et al., "How to Use Microsoft Windows NT 4 Workstation", MacMillan Computer Publishing, USA, 1996, 25 pages.

Gomez-Perez et al., "Towards a Method to Conceptualize Domain Ontologies", Workshop on Ontological Engineering, ECAI' 96, Budapest, Aug. 12, 1996, pp. 41-51.

Gralla, Preston, "How the Internet Works", Millenium Ed., Que Corporation, Aug. 1999, 357 pages (2 pdf attachments).

Horngren, Charles T. et al., "Introduction to Financial Accounting", Revised 3rd Ed., Prentice-Hall, Inc., 1988, 561 pages.

Iannella et al., "Metadata: Enabling the Internet", Jan. 1997, Research Data Network CRC, pp. 1-7.

Muller, Nathan J., "Desktop Encyclopedia of the Internet", Artech House, Inc., 1998, 602 pgs (2 pdf attachments).

Peachtree, "Using General Ledger User Guide", Peachtree Software, Inc., 1989, 319 pages.

St. Pierre et al., "Issues in Crosswalking Content Metadata Standasrds", Oct. 15, 1998, National Information Standards Organization, pp. 1-8.

PR Newswire, "Regions to Offer Secure Internet Banking from Security First Technologies", Apr. 3, 1997, p. 0403ATTH003, 3 pgs.

Reinwald et al., "Storing and Using Objects in a Relational Database", IBM Systems Journal, vol. 35, No. 2, May 1996, pp. 172-191.

Riley, David D., "Data Abstraction and Structures: An Introduction to Computer Science II", Boyd and Fraser Publishing Company, 1987, 30 pages.

Search Report and Written Opinion for Application PCT/US06/29571, mailed on Apr. 16, 2007; 10 pages.

Search Report for Application PCT/US06/25405, mailed on Apr. 3, 2008, 2 pages.

Shah, Ashwin V. et al., "DSM: An Object-Relationship Modeling Language", OOPSLA '89, Oct. 1-6, 1989, pp. 181-202.

Syverson, Nancy, "Inside Graybar: A Profile of the Nation's Top Electrical Distributor", Industrial Maintenance and Plant Operation, vol. 61, No. 11, p. 14, Nov. 2000, 4 pages total.

U.S. Appl. No. 09/569,097, filed May 10, 2000, Advisory Action mailed May 11, 2009, 3 pages.

U.S. Appl. No. 09/569,097, filed May 10, 2000, Advisory Action mailed May 6, 2008, 3 pages.

U.S. Appl. No. 09/569,097, filed May 10, 2000, Advisory Action mailed Jun. 24, 2004, 2 pages.

U.S. Appl. No. 09/569,097, filed May 10, 2000, Final Office Action mailed Jan. 28, 2004, 8 pages.

U.S. Appl. No. 09/569,097, filed May 10, 2000, Final Office Action mailed Feb. 11, 2008, 6 pages.

U.S. Appl. No. 09/569,097, filed May 10, 2000, Final Office Action mailed Mar. 4, 2009, 8 pages.

U.S. Appl. No. 09/569,097, filed May 10, 2000, Final Office Action mailed Jun. 16, 2005, 16 pages.

U.S. Appl. No. 09/569,097, filed May 10, 2000, Notice of Allowance mailed Mar. 5, 2010, 9 pages.
U.S. Appl. No. 09/569,097, filed May 10, 2000, Office Action mailed Oct. 7, 2002, 6 pages.
U.S. Appl. No. 09/569,097, filed May 10, 2000, Office Action mailed Oct. 7, 2004, 12 pages.
U.S. Appl. No. 09/569,097, filed May 10, 2000, Office Action mailed Jul. 3, 2003, 7 pages.
U.S. Appl. No. 09/569,097, filed May 10, 2000, Office Action mailed Aug. 9, 2007, 8 pages.
U.S. Appl. No. 09/569,097, filed May 10, 2000, Office Action mailed Sep. 1, 2009, 6 pages.
U.S. Appl. No. 09/569,097, filed May 10, 2000, Office Action mailed Sep. 3, 2008, 6 pages.
U.S. Appl. No. 11/414,072, filed Apr. 27, 2006, Advisory Action mailed Jan. 9, 2009, 3 pages.
U.S. Appl. No. 11/414,072, filed Apr. 27, 2006, Advisory Action mailed Dec. 28, 2009, 3 pages.
U.S. Appl. No. 11/414,072, filed Apr. 27, 2006, Final Office Action mailed Oct. 16, 2009, 19 pages.
U.S. Appl. No. 11/414,072, filed Apr. 27, 2006, Final Office Action mailed Oct. 23, 2008, 21 pages.
U.S. Appl. No. 11/414,072, filed Apr. 27, 2006, Office Action mailed Mar. 24, 2009, 16 pages.
U.S. Appl. No. 11/414,072, filed Apr. 27, 2006, Office Action mailed Apr. 24, 2008, 33 pages.
U.S. Appl. No. 11/415,759, filed May 1, 2006, Office Action mailed Mar. 30, 2010, 9 pages.
U.S. Appl. No. 11/559,969, filed Nov. 15, 2006, Office Action mailed Oct. 2, 2009, 11 pages.
U.S. Appl. No. 11/559,969, filed Nov. 15, 2006, Office Action mailed Mar. 31, 2010, 13 pages.
U.S. Appl. No. 11/559,969, filed Nov. 15, 2006, Office Action mailed Mar. 5, 2009, 11 pages.
U.S. Appl. No. 11/760,427, filed Jun. 8, 2007, Office Action mailed Dec. 11, 2009, 13 pages.
U.S. Appl. No. 11/760,519, filed Jun. 8, 2007, Office Action mailed Jan. 21, 2010, 9 pages.
White, Ron, "How Computers Work", Millenium Ed., Que Corporation, Sep. 1999, 322 pages (2 pdf attachments).
Oracle Applications, Concepts, Release 11 for UNX, Apr. 1998, 90 pgs.
Oracle Server Distribution Systems, vol. II: Replicated Data, Release 7.3, Feb. 1996, 469 pgs.
Skold, Martin, "QDB—A Query Processor for the High Performance, Parallel Data Server NDB Cluster", Linkopings University, Sweden, Apr. 1999, 28 pgs.
U.S. Appl. No. 09/967,493, filed Sep. 27, 2001, Office Action mailed Jan. 14, 2004, 15 pages.
U.S. Appl. No. 09/967,493, filed Sep. 27, 2001, Office Action mailed Oct. 2, 2004, 22 pages.
U.S. Appl. No. 09/967,493, filed Sep. 27, 2001, Final Office Action mailed Aug. 19, 2005, 23 pages.
U.S. Appl. No. 09/967,493, filed Sep. 27, 2001, Office Action mailed May 16, 2006, 26 pages.
U.S. Appl. No. 09/967,493, filed Sep. 27, 2001, Petition Decision mailed Dec. 18, 2006, 1 page.
U.S. Appl. No. 09/967,493, filed Sep. 27, 2001, Final Office Action mailed Dec. 19, 2006, 33 pages.
U.S. Appl. No. 09/967,493, filed Sep. 27, 2001, Office Action mailed Sep. 11, 2007, 15 pages.
U.S. Appl. No. 09/967,493, filed Sep. 27, 2001, Notice of Allowance mailed Apr. 11, 2008, 12 pages.
U.S. Appl. No. 10/394,409, filed Mar. 21, 2003, Office Action mailed Sep. 1, 2006, 9 pages.
U.S. Appl. No. 10/394,409, filed Mar. 21, 2003, Final Office Action mailed Feb. 22, 2007, 13 pages.
U.S. Appl. No. 10/394,409, filed Mar. 21, 2003, Advisory Action mailed May 2, 2007, 3 pages.
U.S. Appl. No. 10/394,409, filed Mar. 21, 2003, Office Action mailed Aug. 3, 2007, 11 pages.
U.S. Appl. No. 10/394,409, filed Mar. 21, 2003, Office Action mailed Feb. 21, 2008, 21 pages.
U.S. Appl. No. 10/394,409, filed Mar. 21, 2003, Final Office Action mailed Sep. 29, 2008, 19 pages.
U.S. Appl. No. 10/394,409, filed Mar. 21, 2003, Advisory Action mailed Jan. 23, 2009, 3 pages.
U.S. Appl. No. 10/394,409, filed Mar. 21, 2003, Office Action mailed Mar. 4, 2009, 13 pages.
U.S. Appl. No. 10/394,409, filed Mar. 21, 2003, Final Office Action mailed Aug. 19, 2009, 11 pages.
U.S. Appl. No. 10/394,409, filed Mar. 21, 2003, Advisory Action mailed Oct. 23, 2009, 3 pages.
U.S. Appl. No. 10/375,694, filed Feb. 26, 2003, Office Action mailed Sep. 7, 2004, 12 pages.
U.S. Appl. No. 10/375,694, filed Feb. 26, 2003, Final Office Action mailed May 13, 2005, 13 pages.
U.S. Appl. No. 10/375,694, filed Feb. 26, 2003, Office Action mailed Oct. 13, 2005, 9 pages.
U.S. Appl. No. 10/375,694, filed Feb. 26, 2003, Notice of Allowance mailed Apr. 3, 2006, 4 pages.
U.S. Appl. No. 10/706,151, filed Feb. 26, 2003, Office Action mailed Oct. 20, 2004, 4 pages.
U.S. Appl. No. 10/706,151, filed Feb. 26, 2003, Final Office Action mailed May 13, 2005, 6 pages.
U.S. Appl. No. 10/706,151, filed Feb. 26, 2003, Office Action mailed Sep. 16, 2005, 7 pages.
U.S. Appl. No. 10/706,151, filed Feb. 26, 2003, Final Office Action mailed Mar. 23, 2006, 9 pages.
U.S. Appl. No. 10/706,151, filed Feb. 26, 2003, Office Action mailed Oct. 10, 2007, 5 pages.
U.S. Appl. No. 10/706,151, filed Feb. 26, 2003, Notice of Allowance mailed Apr. 18, 2008, 8 pages.
U.S. Appl. No. 09/562,785, filed May 2, 2000, Office Action mailed Feb. 17, 2004, 10 pages.
U.S. Appl. No. 09/562,785, filed May 2, 2000, Final Office Action mailed Sep. 27, 2004, 18 pages.
U.S. Appl. No. 09/562,785, filed May 2, 2000, Office Action mailed Jul. 25, 2006, 18 pages.
U.S. Appl. No. 09/562,785, filed May 2, 2000, Final Office Action mailed Jan. 11, 2007, 17 pages.
U.S. Appl. No. 09/562,785, filed May 2, 2000, Advisory Action mailed Mar. 26, 2007, 3 pages.
U.S. Appl. No. 09/562,785, filed May 2, 2000, Notice of Allowance mailed May 21, 2007, 7 pages.
U.S. Appl. No. 09/617,590, filed Jul. 18, 2000, Office Action mailed Feb. 17, 2004, 10 pages.
U.S. Appl. No. 09/617,590, filed Jul. 18, 2000, Office Action mailed Nov. 16, 2004, 11 pages.
U.S. Appl. No. 09/617,590, filed Jul. 18, 2000, Final Office Action mailed Jun. 14, 2005, 10 pages.
U.S. Appl. No. 09/617,590, filed Jul. 18, 2000, Office Action mailed Jul. 25, 2006, 9 pages.
U.S. Appl. No. 09/617,590, filed Jul. 18, 2000, Office Action mailed Sep. 27, 2006, 9 pages.
U.S. Appl. No. 09/617,590, filed Jul. 18, 2000, Notice of Allowance mailed Mar. 27, 2006, 10 pages.
U.S. Appl. No. 11/496,057, filed Jul. 28, 2006, Office Action mailed Jul. 21, 2010, 23 pages.
U.S. Appl. No. 11/760,427, filed Jun. 8, 2007, Advisory Action mailed Aug. 30, 2010, 3 pages.
U.S. Appl. No. 11/760,427, filed Jun. 8, 2007, Final Office Action mailed Jun. 25, 2010, 13 pages.
U.S. Appl. No. 11/760,519, filed Jun. 8, 2007, Final Office Action mailed Jul. 26, 2010, 15 pages.
Fiore, M., et al., "Oracle Applications Concepts, Release 11 for UNIX," Oracle Corporation, 1998, 90 pgs.
U.S. Appl. No. 11/415,759, filed May 1, 2006, Final Office Action mailed Nov. 17, 2010, 9 pages.
U.S. Appl. No. 11/415,759, filed May 1, 2006, Advisory Action mailed Jan. 26, 2011, 3 pages.
U.S. Appl. No. 11/760,427, filed Jun. 8, 2007, Office Action mailed Apr. 8, 2011, 19 pages.
U.S. Appl. No. 11/760,472, filed Jun. 8, 2007, Office Action mailed Mar. 25, 2011, 7 pages.

U.S. Appl. No. 11/760,493, filed Jun. 8, 2007, Office Action mailed Mar. 30, 2011, 9 pages.
U.S. Appl. No. 11/760,505, filed Jun. 8, 2007, Office Action mailed Apr. 4, 2011, 7 pages.
U.S. Appl. No. 11/496,057, filed Jul. 28, 2006, Advisory Action mailed Mar. 9, 2011, 3 pages.
U.S. Appl. No. 11/496,057, filed Jul. 28, 2006, Final Office Action mailed Jan. 4, 2011, 17 pages.
U.S. Appl. No. 11/496,057, filed Jul. 28, 2006, Notice of Allowance mailed Jun. 13, 2011, 9 pages.

* cited by examiner

REVENUE MANAGEMENT SYSTEM AND METHOD

CROSS-REFERENCE TO RELATED APPLICATIONS

This application claims the benefit of Provisional Application No. 60/694,743, filed 28 Jun. 2005, and 60/694,743, filed 28 Jul. 2005 which are hereby incorporated by reference in their entireties.

BACKGROUND OF THE INVENTION

Telecommunication network operators and service providers are currently implementing the internet protocol multimedia subsystem (IMS). IMS is a set of Internet Protocol (IP) standards for session-based control of multimedia and telephony services on any network type, including circuit switched networks, packet-switched networks, and the public switched telephone network (PSTN). IMS manages the communication, collaboration, and entertainment media over internet protocol. IMS enables users to access both content and other users in ways that are natural and intuitive.

IMS provides users with functionality that is not dependent on fixed or mobile networks and also retains existing protocols, including the session initiation protocol (SIP). The SIP is central to IMS. Originally developed for voice over Internet Protocol (VoIP), SIP enables multiple users to enter and exit at will an ongoing communications session (i.e. a connection between two or more communications terminals such as a mobile handset a content server, or a personal computer). Moreover, SIP enables users to add or remove media (voice, video, content, etc.) dynamically during a session and run multiple sessions in parallel.

IMS enabled services will include combinations of push-to-talk, click-to-dial, multi-player gaming, video telephony, SMS, dynamic push content, including file sharing, and video conferencing, and location-based commerce among other communication, collaboration, and entertainment services.

These services previously existed in independent silos: that is, users must exit one service (i.e., terminate a session) before they can access a new service (i.e., initiate a session). The routing, network location, addressing, and session management of IMS eliminates the walls of the silos to effect a so-called blended functionality that lets users move freely between networks and services while maintaining multiple concurrent sessions. In this way, IMS transforms a sequence of discrete communication events into a single shared communications environment.

For example, users will be able to select a communications mode (voice, voice with video, text-to-speech email, and so on) that best suits their circumstances while retaining the freedom to change that selection dynamically by adding a video stream midway through a voice call for example. Users will also be able to access familiar services on any device and via any network type, fixed or mobile. And they'll enjoy these freedoms along with new functionalities such as broader payment options, credit control presence management, and convenient connectivity to groups.

IMS also provides operators and service providers opportunities for cost reductions and revenue growth. They can expect cost reductions because IMS enabled services, unlike today's siloed services, do not require replication of every functionality: charging, routing, provisioning, and subscriber management, for example. Rather, IMS services can reuse the same functionality across all services, thereby accruing for their operators significant savings in capital and operational expenditures. Revenue growth through enabling enhanced services is IMS's other benefit. In this way, IMS is the panacea-in-waiting to communications and media companies, who face the threat of commoditization.

Telecommunication network Operators and service providers will need a convergent charging system to realize the value of IMS. Such a system—with its integrated view of the customer—is necessary to apply cross-service discounts on bundled offerings and other marketing promotions, as well as a single consolidated bill for each customer—even when services originate from multiple third-party providers.

Legacy billing applications have become increasingly inadequate to the demands of charging for IMS-enabled services as charging has undergone a profound transformation in recent years: from batch to real-time processing, from a back-office support function to a front-office mission-critical function, from a cost to be minimized to a strategic opportunity for revenue maximization.

Further, operators know that consumers have choices. In this environment, CSP's have difficulty remaining competitive if unable to maintain an uptime of at least 99.999%—so-called "five-nines" availability. Five-nines, which amounts to barely five minutes of downtime per year, is unprecedented in traditional billing.

As batch-processing systems, traditional billing vendors did not have to provide highly-available solutions. If the billing system failed during a batch run, the job could simply be restarted once the system became available. For this reason CSPs were forced to maintain separate systems to handle their prepaid and postpaid subscribers and services. Prepaid voice services were generally managed by the network equipment vendors, who traditionally provided prepaid solutions in the form of a service control point (SCP) or service node. These systems—built with the network in mind, especially prepaid voice—were designed to achieve the high-availability and low latency requirements of tier-1 service providers. However, this design focus, together with support for only very simple rating capabilities, resulted in these systems being much more restrictive than their postpaid counterparts.

Because no single system provided support for all the revenue management functions, CSPs have often had to deploy dozens of separate systems to support those functions. Different "stovepipe" systems managed prepaid and postpaid services, while still other systems managed services such as voice, data, content, and messaging. Such a multifarious environment has driven operational costs higher and hampered CSPs' ability to meet increasingly aggressive market requirements.

CSPs can no longer afford the operational excess of maintaining multiple systems: instead CSPs need a simple, convergent, and modular revenue management solution that delivers high performance and high availability as well as flexibility and scalability. The revenue management system must also meet the demands of consumer marketing-a complex function that increasingly entails bundled offerings, conditional multiservice discounts, highly segmented promotions, and revenue sharing across a multipartner value chain of content providers, service providers, and network operators.

Unlike telecommunications networks, which must route their transport (calls in circuit-switched networks and packets in packet-switched networks) in real time, legacy billing systems for telecommunications providers have customarily fulfilled a back-office function, batch processing records such as call detail records and IP detail records. If a billing system weren't available when scheduled to process a particular batch, engineers could fix the problem, then run the process a few hours behind schedule. In the worst-case scenario, customers' bills would arrive in their mail boxes a day or two later than usual. But new expectations of communications service users are now changing the rules of the billing game.

Today's users demand diverse payment options in line with their varied personal, business, and family needs.

Whereas some will continue to favor long-standing relationships in which they settle their accounts with operators in the traditional manner of postpayment via invoice, more and more users now require the freedom to prepay—perhaps by purchasing a prepaid card at a grocery store as credit towards service from potentially multiple CSPs over a period of time. Still other users want to pay for products and services as they consume them-so-called now-pay—by providing a debit- or credit-card number at the commencement of each transaction.

In the absence of a convergent real-time solution, CSPs have had to address the bang needs of their prepaid, postpaid, and now-pay customers by maintaining multiple, non-integrated billing and customer-care systems. Indeed, they've had no alternative because legacy billing systems were never designed to accommodate the transactional real-time requirements for prepay and now-pay services. And they certainly weren't built with the requisite low latency and five-nines availability that a revenue management system needs to process as many as several hundred million transactions per day in real time via a direct connection to the telecommunications network.

The absence of a billing system that could meet the high performance/low-latency and high-availability requirements for prepaid has imposed significant costs on CSPs since they were forced to maintain multiple separate systems for their prepaid/postpaid environments and services.

BRIEF SUMMARY OF THE INVENTION

A revenue management system and method for revenue management are disclosed. The revenue management system can be a network of computers, a single computer, a program on computer readable medium, software and/or hardware architecture, or combinations thereof. The revenue management system can be used, for example by telecommunication-network operators and service providers, to manage the use of and revenue generated by telecommunications networks. The telecommunications networks can be wired and/or wireless.

The revenue management system can perform convergent real-time charging for prepaid, postpaid, and now-pay telecommunication network user accounts. The revenue management system can manage revenues through the entire service cycle, from revenue generation to revenue capture to revenue collection to revenue analysis. The revenue management system can have a hardware and/or software revenue generation module or architecture, revenue capture module or architecture, revenue collection module or architecture, revenue analysis module or architecture, or combinations thereof. (Any elements or characteristics denoted or described as being modules, architectures, layers, or platforms, herein, can be any of the other of modules, architectures, layers or platforms.)

The revenue generation module or architecture can minimize delays of deployment of new-services on the telecommunication network. The revenue generation module or architecture can have GUI-based applications for rapidly provisioning, pricing, discounting, and managing all aspects of customer and partner relationships such as personalized promotions and revenue sharing.

The revenue capture module or architecture can leverages a high-performance and high-availability platform that converts all transactions into revenue with zero leakage from fraud or system downtime. The high availability platform further minimizes customer churn.

The revenue collection module or architecture can ensure accurate bills for postpaid accounts while collecting all prepaid and now-pay revenue in real-time. The revenue collection module can generate partner (e.g., business partner) statements and provide a real-time view of finances, for example, to suggest changes in marketing strategy.

The revenue analysis module or architecture can process the transactions that pass through the revenue management system and can provide data for predetermined mathematical functions (i.e., data analysis). The revenue analysis module can be used with IMS-enabled services.

The revenue management system can provide carrier-grade performance, high availability, unlimited scalability, flexibility to rapidly launch and manage IMS-enabled services, perform end-to-end revenue management, and combinations thereof.

The revenue management system can be a single convergent platform for service providers to manage revenue in real time across customer type, network, service, payment method and geography. The revenue management system can have high-performance, high-availability, and scalability, for example equal to that of a front-end carrier-grade network element, with the functionality and flexibility of a convergent revenue management system.

The revenue management system can be a unified system that manages revenue in real time across any customer type (residential or business), network type (packet- or circuit-switched), service type (voice, data, commerce, and so on), payment method (prepaid, postpaid, and now-pay), and geography (multiple currencies and tax regimens). After examining the implications of inadequate performance and availability in CSPs' billing and customer-care platforms. The revenue management system can have a revenue capture platform and an in-memory object store (e.g., TIMOS or other technology) for high performance/low latency and an active/active staged architecture for high availability.

The revenue management system can deliver carrier-grade performance, unlimited scalability, five-nines availability, the flexibility to rapidly launch and manage new services, and combinations thereof.

The revenue management system can give operators a unified view of their subscribers (e.g., rapid and organized viewing of database information for users across various networks). The revenue management system can be configured to analyze database data for market segmentation, to create discounts (e.g., multiservice discounts), and promote and deliver functionality, such as consolidation of all services onto a single bill.

The revenue management system can accurately manage multiple revenue touch points with end-customers, for example, to enable networks to provide and bill a variety of voice and multimedia services.

The convergent revenue management system can eliminating duplication and exploiting economies of scope, it can thus incur lower operational costs than multiple non-integrated systems. Such efficiencies can translate into substantial savings in resources, skills, training, hardware, etc. The convergent revenue management system can have greater flexibility and scalability than multiple stand-alone systems. The system can provide an integrated view of the customer with important functionality benefits such as the ability to apply cross-service discounts to bundled offerings and the capacity to generate a single bill for each customer, even when services originate from multiple providers.

DETAILED DESCRIPTION

Figure 1:
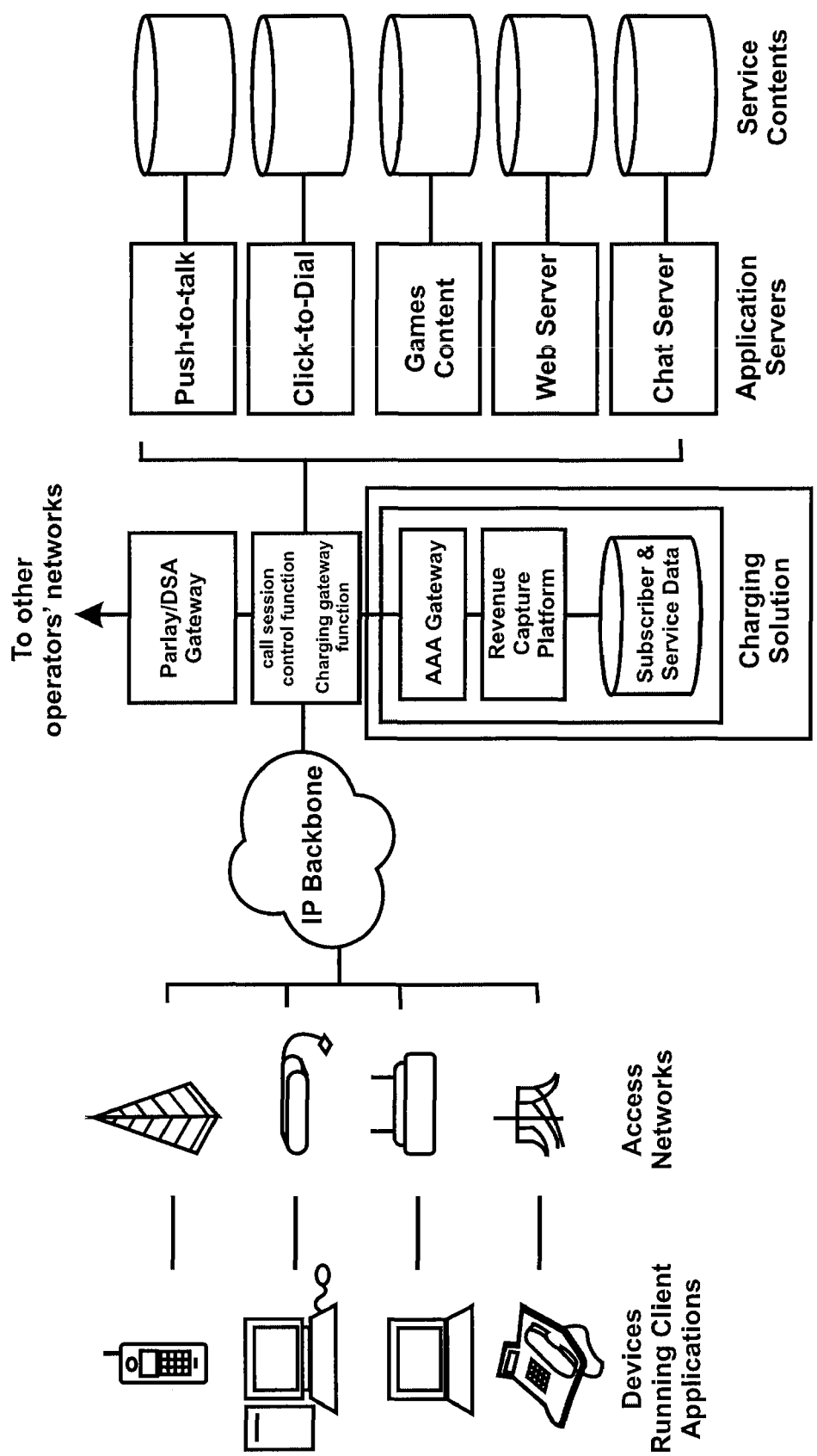
FIG. 1 illustrates a variation of the revenue management system integrated into the IMS framework.

FIG. 1 illustrates that the revenue management system can be integrated (i.e., in data communication with) the IMS framework. Users can access IP-based services via any device and any access network through a standardized access point, the CSCF (call session control function) or SIP server. The CSCF sets up and manages sessions, forwarding messages and content from other users or from content and application servers. The CSCF works in partnership with the HSS (home subscriber service), which manages subscriber data and preferences, enabling users to find one another and access subscribed services. A CGF (charging gateway function) can mediate access to other operators' networks and support application for charging, provisioning, and customer service.

Figure 2:
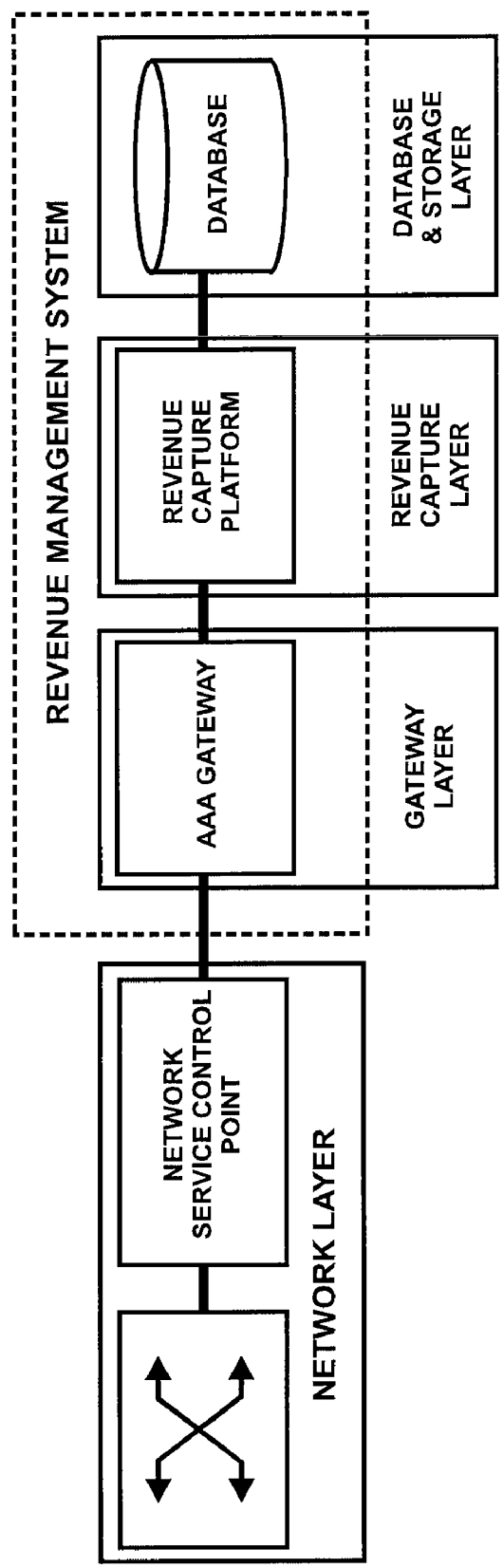
FIG. 2 illustrates a variation of the revenue management system with a network layer.

FIG. 2 illustrates that the architecture of the revenue management system can have a gateway layer (e.g., a AAA Gateway), a revenue capture layer, and a database and storage layer. The gateway layer can connect to the external network via a service platform such as HP OpenCall (from Hewlett Packard, Inc., Palo Alto, Calif.), which in turn can connects to a network switch.

The gateway layer can be an interface to the network layer. Connections to the network layer can be maintained via one, two or more AAA (authentication, authorization, accounting) Gateway managers. The AAA Gateway managers, which can include one primary and one or more idle-but-running back up, connect to the network SCP via TCP/IP, and manage a number of tasks. The tasks can include protocol translation, asynchronous interface, load balancing, service-level agreement (SLA) latency enforcement, failure detection, failure handling, failure recovery, and combinations thereof.

The protocol translation can provide high-speed translation from the protocol used by the network SCP to a communication protocol (e.g., Portal Communications Protocol (PCP)). The AAA Gateway can support the HP OpenCall's Message Based Interface (MBI) protocol, Diameter Charging, and PCP. The AAA Gateway can provide extension to support additional protocols.

In asynchronous connection to the SCP, requests can be received from the SCP and acknowledged. Following completion of the requested operation, the asynchronous interface of the AAA Gateway can send a response to the SCP with the final results.

The load balancing element can distribute requests evenly across the available Connection Managers using a round-robin algorithm.

The SLA enforcement can monitor and guarantee conformance to a service-level agreement's latency requirements.

The failure detection element can detect failures such as a broken link between a AAA Gateway and a connection manager in the revenue capture platform.

The failure handling element can provide an interim request storage facility for requests processed during back-end failures and pending recovery, and a degraded mode of operation for cases in which the back end is not available or simply not responding within the specified latency levels.

The failure recovery element can replay requests into the revenue capture platform following a failure.

When the call (or other connection) comes to the network, the SCP can query the AAA Gateway in order to grant the service (i.e. authorize the call). During the call the SCP keeps the revenue management system appraised of the call status by passing call-start and call-end requests-as well as Reauthorizing requests if the previously authorized quantity is close to exhaustion.

The AAA Gateway can convert the SCP requests into event data records (EDR). The AAA Gateway can then forward the EDR to a specialized processing pipeline-authentication, authorization, or accounting, for example, depending on the service and request type. The processing pipelines can contain a module that can call an API of the CM in the Revenue Capture Platform. This is a synchronous call that blocks processing until receipt of a response. The response can then undergo translation into the EDR, and the EDR can pass to the network output module, which can send the response back to the SCP.

This process can be monitored for latency by a timeout monitoring facility in the AAA Gateway. If the timeout facility detects an unacceptable latency, the timeout facility can pass the EDR to a timeout pipeline. The timeout pipeline can then execute business logic to handle the request in a degraded mode in order to ensure a response with required latency levels. The degraded mode can allow the timeout pipeline to make a decision on how to proceed based on a configurable set of rules. For example, if the request is for authorization of a local call, the rules might indicate approval by default following the timeout of such a request. A timed-out request for authorization of an international call, in contrast, might receive a default denial.

Two other pipelines—the exception pipeline and the replay pipeline—can lean up, store, and replay timed-out requests to prevent any revenue leakage. If a timeout was caused by a failure in the Revenue Capture Platform, the replay pipeline can read the replay log after the Revenue Capture Platform is back online and send it the logged requests. If a timeout happened for other reasons, the replay can start immediately.

Figure 3:
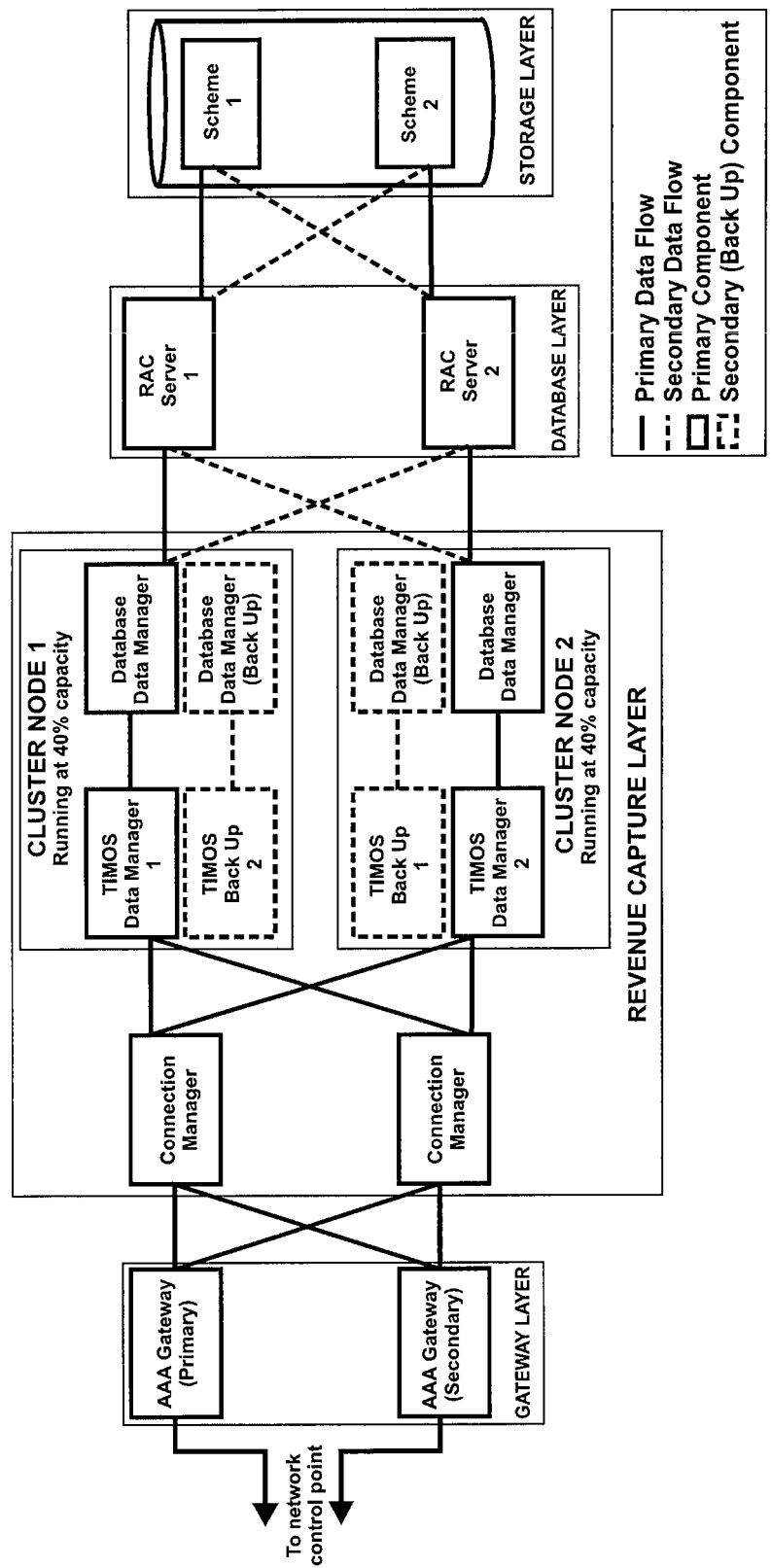
FIG. 3 illustrate a variation of the revenue management system.

The revenue capture layer can implement the authentication and authorization that is necessary for prepaid and now-pay transactions. The revenue capture layer can handle the accounting tasks of event rating and recording all transactions. FIG. 3 illustrates that the revenue capture layer can have one, two or more Connection Managers, Database Data Managers, and TIMOS (transactional in-memory object store) Data Managers, a high-performance in-memory store that can synchronize with the database. The elements of the revenue capture layer can be encompassed by the Revenue Capture Platform.

Each AAA Gateway manager can connect to one, two or more distinct connection managers via TCP/IP. As opposed to the primary/backup model, these two connections are always in use during normal processing. Initial requests to the CAIs are distributed evenly by a simple round-robin algorithm.

Cross-machine distribution of the connections can provide fault-tolerance at the hardware level. (The number of Connection Managers could be determined by the operator's availability and scalability requirements).

The Connection Managers can rout requests to the appropriate TIMOS Data Manager or back-end Database Manager. The design of the revenue management system can provide time-sensitive requests such as authentication and authorization to be performed by accessing data from the high-speed in-memory TIMOS cache only. Accounting requests, which can tolerate higher latencies, can access both the TIMOS cache and the back-end database.

The system can be configured so non-real-time requests bypass the TIMOS Data. Non-real-time requests can include, for example, batch rating or billing jobs, or real-time requests that do not require millisecond-level response times, such as an account query by a customer service representative.

Figure 4:
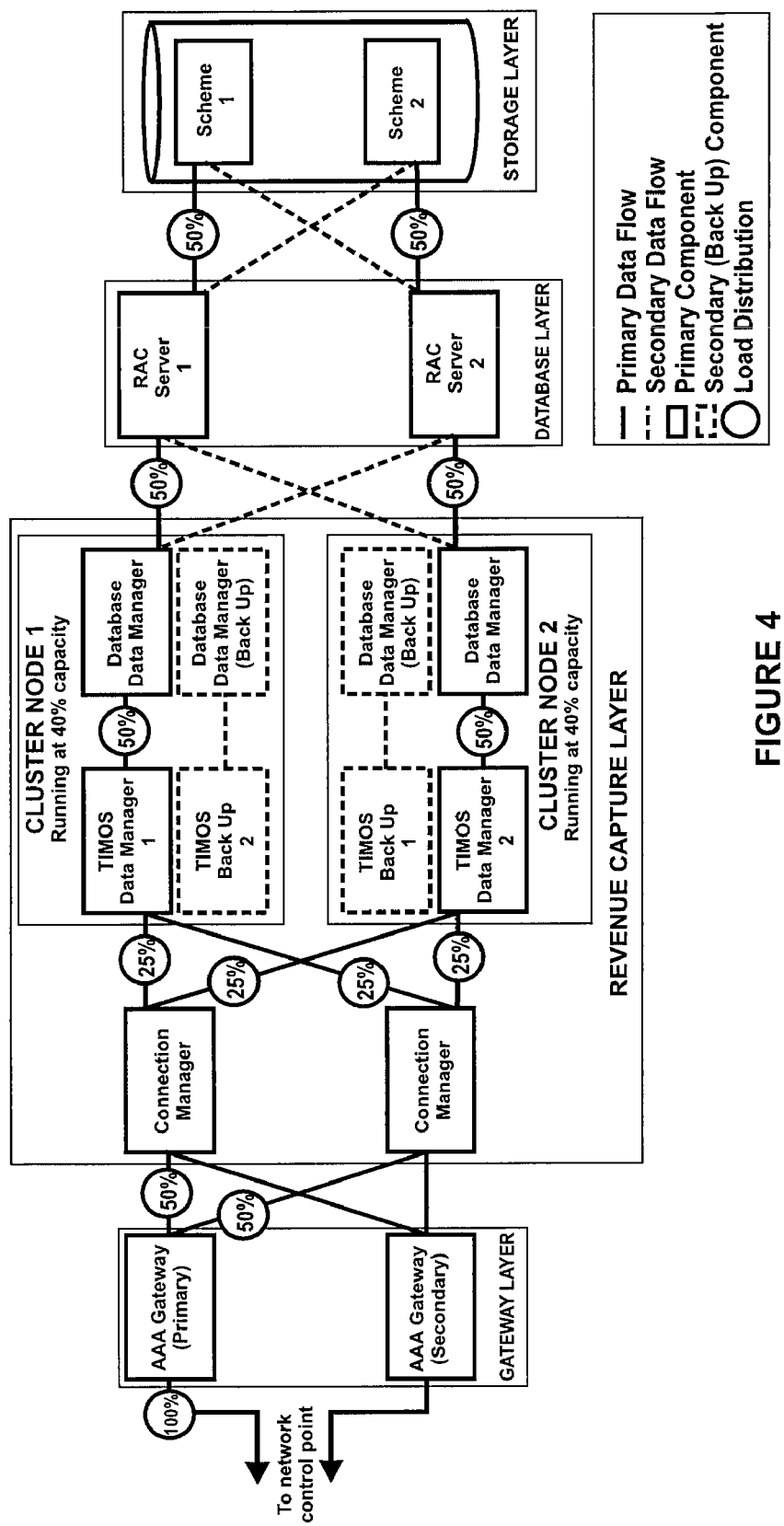
FIG. 4 illustrates a variation of the revenue management system with exemplary load distributions.

FIG. 4 illustrates a variation of the revenue management system with exemplary load distributions shown. The architecture of the system can have one, two or more TIMOS instances and their back-up counterparts. Each TIMOS instance can have three components: a reference object cache, a data migratory, and a transient object store.

The reference object cache can be a cache area for database objects such as customer account records, required for read-only reference during real-time authentication and authorization processes.

The data migratory can be a subsystem to fill the reference object cache from the database.

The transient object store can be an area used to store temporary objects for TIMOS-only use such as active-session objects and resource-reservation objects.

The TIMOS instances can serve distinct sets of the subscriber base. For example, approximately 50% of subscribers per instance for the minimal two-instance configuration shown in FIG. 4. Each primary TIMOS instance can run on an independent server with that same server running the back-up instance of another primary TIMOS instance.

Meanwhile, the Connection Managers can consult a directory server in order to route requests to the correct instance. The directory server can be configurable as a separate process or as a part of any TIMOS instance.

The TIMOS Data Managers in turn can connect to at least two Database Data Managers, both of which are active and can take over the workload of the other in the case of a failure. The Database Data Managers interface with the back-end relational database.

The database and storage layers can have one or more server clusters, cluster software, one or more storage area networks, and combinations thereof. The server cluster can be a configuration of at least two database servers, which process data for a single database. The cluster software can manage prepaid payment accounts (e.g., Oracle RAC (Real Application Cluster) cluster software or to execute with the same). The storage area network can support high-speed and high-availability disk storage.

The revenue management system can access a high-performance relational database such as Oracle RAC via a high-speed storage-area network. The system can utilize multi-threading and TIMOS data management. TIMOS can access system memory (i.e. RAM). Requests for data in RAM can be processed much faster than requests for data in the disk-based database. Throughput and latency can be reduced compared to the relational database because of the following differences between TIMOS data management and the RDBMS:

TIMOS can store in-memory data and avoid the time delays of database access and the translation between a relational representation and the database's physical format.

The revenue management system employs internal search and storage algorithms that have been optimized for in-memory data, further reducing latencies.

Read-only requests for TIMOS-managed data can avoid round trips to the back-end database and subsequent disk storage, thereby avoiding multiple network hops and their associated latencies. The creation and update of transient objects can be performed entirely in memory by TIMOS, requiring no disk access operations.

The system can have a distribution of operations via a staged-availability architecture, an active/active redundancy configuration, and controllable system renewal.

The revenue management system can have staged-availability architecture that allow higher layers with very high availabilities to maintain system operation-in a degraded mode if necessary—in the event of a failure in a lower-layer component within the Revenue Capture Platform. For example, the Gateway layer can maintain service authorization availability if the primary AAA Gateway loses connectivity to its Connection Manager in the revenue capture layer. Even when operating in a degraded mode, the system can prevent revenue leakage by ensuring that all events are captured in a replay log and persisted to disk for durability. Use of the replay log can ensure that each event undergoes charging as soon as the system recovers.

TABLE 1

Layer Availability and Recovery

| Layer | Percentage Availability |
|---|---|
| Network | 99.999% |
| Gateway | 99.999% |
| Revenue Capture | 99.95% |
| Database & Storage | 99.999% |

Table 1 illustrates the exemplary percentages for each of the revenue management system's layers. Because the AAA Gateway is designed to provide 99.999% availability for service authorization and is able to run in a degraded mode, service availability is significantly higher than the availability of the least-available component. The front-office (e.g., RAM) real-time processing can enable the high availability.

The system can have an active/active redundancy or an active/passive redundancy. The active/active redundancy can detect failures in components substantially immediately and automatically switch the load of the failed component and to its counterpart. The counterpart can assume the additional load of a failed component because the system can be configured (e.g., appropriately scaled) so nodes run sufficiently below capacity under normal operation and can therefore absorb an additional load during failover.

The AAA Gateways can divide traffic 50/50 between two active Connection Managers. Each connection manager can route the requests to the appropriate TIMOS Data Manager or Database Data Manager. Each cluster node can run at 40% capacity during normal operation. If one of the TIMOS Data Managers fail to respond to the Connection Managers, the system can automatically failover to a back-up instance of a TIMOS Data Manager that runs on the other cluster node.

Upon failover, the data migrator can begin to load the backup TIMOS cache with any reference data that had not been preloaded. Processing on the backup system can resume immediately after failover (e.g., the system need not to wait for completion of the data migration). If a request comes in to the back-up TIMOS DM for which the needed data has not yet been loaded into the TIMOS cache, the request can be passed on to the appropriate database DM. The timeout monitor can ensure that the response is made within the required latency limits, although the latency will be higher than for requests to a filled cache. In addition, the requested object can be cached as a side effect for a request to an un-cached object, for example, making subsequent requests for the same data much faster.

The system can support other types of failover. For example, if the connection between the AAA Gateway and a Connection Manager fails, the Connection Manager whose connection remains operable can assume the full load. Meanwhile, the AAA Gateway can automatically execute custom business logic if it does not receive a response from a Connection Manger within a specified latency. For example, if a Connection Manager failed to respond to a database-update request, the business logic can ensure that the AAA Gateway saves the request for subsequent processing once the system had recovered. Custom business logic can maintain operation—albeit in a degraded mode—under severe failure conditions that deny access to customer balance information.

High Availability at the database and storage layer can be supported by a combination of a Storage Area Network, a Cluster Server, and Oracle's RAC software. FIG. 4 illustrates a database configuration which can have at least two independent servers (e.g., RAC servers), for example serving distinct customer segments, located in different database schemas. Each RAC server can dedicated to one database schema. During normal operation, the traffic for both halves of the system can follow different paths and not interfere with each other. In a failure situation, Oracle can redirect the traffic to the remaining RAC server. Oracle RAC can ensure a smooth transition of the traffic to the remaining node.

Other optional approaches such as storage arrays and disk mirroring can provide additional resilience in the database and storage layers.

The revenue management system can have a controllable system renewal module, for example to further supplement the high availability. The controllable system renewal can be configured to cause the CSP to limit the lifetime of all system processes, with processes set to restart automatically at designated intervals. Controllable system renewal (i.e., similar to a scheduled failover) can censure that any cumulative errors that might otherwise endanger system stability cannot become critical. By detecting such errors in a relatively benign state, controllable system renewal can affords time for engineers to fix the source of the error accumulation. More importantly, the controllable system renewal module can ensure that unscheduled failovers, when they do occur, execute properly.

The Content Manager module can provide a secure billing interface to link operators with value-added service providers. The revenue management module can enable business partners access (e.g., through an internet or other GUI interface) to the revenue manager module's real-time functionality without the need for business partners to purchase and support a full system of their own.

The system can have flexible GUI applications for pricing management, customer management, partner management, and service enablement. For example, the system can have a Pricing Center/Management module. The pricing center/management module can have pricing management functionality, such as tools to quickly define a product and service catalog together with the associated rules for pricing and discounting.

The pricing management module can define pricing, promotions and service bundles with a unified pricing interface (e.g., one tool/one process) for any payment method. The pricing management module can use any attribute from within the rating record as part of the rating scheme. The pricing management module can support one-time non-recurring events (e.g., registration/cancellation charges, m-commerce, content, and various service usage) as well as prepaid support for recurring events of varying duration (e.g. weekly, monthly, multi-monthly, and annual events). The pricing management module can manage tiered, volume, and multi-service discounting options as well as user-defined discounting. The pricing management module can track time of day/week and special days. The pricing management module can group pricing options such as closed user groups and friends and family. The pricing management module can provide support for zone- and location-based pricing. The pricing management module can manage unlimited numbers of pricing metrics: transport based (per minute, per kilobyte, etc.), value-based (per ring tone, per game, per message, etc.), hybrid, or any metric that the CSP may wish to define in the future. The pricing management module can assign one or more balance impact to any number of balances assigned—monetary or non-monetary. The pricing management module can define proration rules. The pricing management module can define linkage between products and services to entries in the general ledger (G/L).

The system can have a customer management interface module. The customer management interface can support creation and management of customer and partner accounts, for example, natively within the revenue management system, via real-time or batch CRM/PRM integration, via integration with legacy applications, or combinations thereof.

The revenue management system can have other modules to activate, deactivate, provision, and maintain device-related information on services. For example, some services (e.g., GSM telephony) can be provisioned in real time and other services (e.g., high-speed Internet access) can have staged provisioning. The system can have one or more service manager modules to provide specific service management capabilities based on industry requirements for services and standards such as GPRS, GSM, WAP, LDAP, and SIM.

The revenue management system can support unlimited and near-linear scalability with little or no software modification and no loss of performance. As subscriber or transaction volume grows, operators can add capacity at any time through either vertical scaling (e.g., adding CPUs to an existing server) or horizontal scaling (e.g., deploying additional servers). With this additional capacity, the system's high performance and high availability can remain undiminished.

Figure 5:
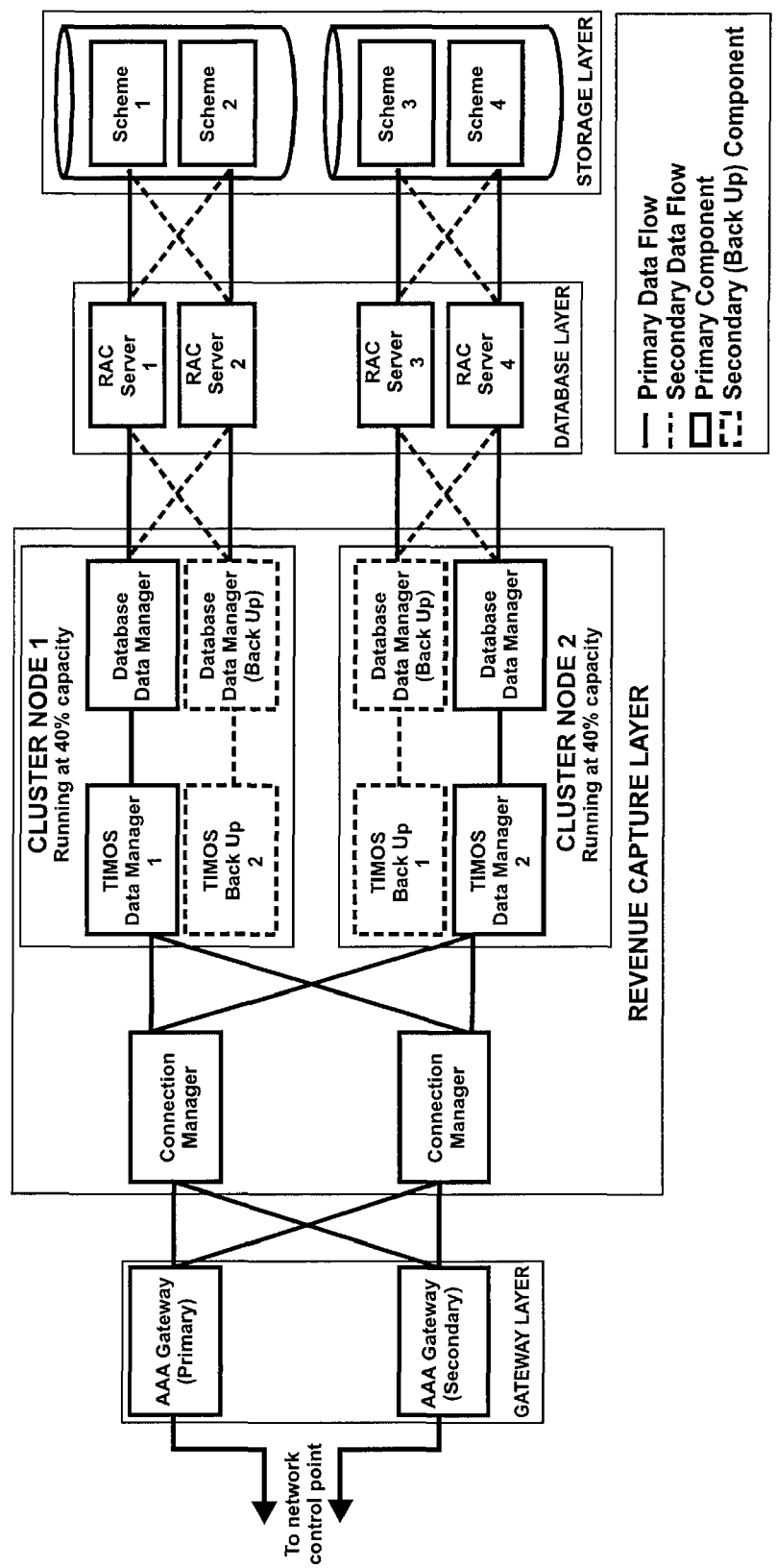
FIG. 5 illustrates a variation of the revenue management system having multi-database subsystems.

The operator can add the necessary hardware to support another TIMOS instance pair, for example, if growth in transaction volume approaches the capacity of existing TIMOS instances. The system is readily scalable by the addition of multiple databases such as Oracle RAC clusters, for example if TIMOS is not the limiting factor in the system's capacity. FIG. 5—an extension of the minimal configuration of FIG. 3—depicts a variation of multi-DB scalability.

The revenue management system can manage credit in a variety of customer-centric methods. For example, families can have separate pre-pay, and/or post-pay, and/or now-pay sub-accounts on the same family plan (e.g., if each member of the family wants a different payment scheme). Companies can divide accounts between personal and business use for the company's communications devices (e.g., an employee can make personal calls and business calls and be billed into separate accounts).

For service providers accustomed to billing via a monthly batch process that prepares, prints, and mails invoices to customers, customer-centric billing in the era of IMS means an end to business as usual. Instead, service providers must implement a more flexible real-time system that can manage a customer's credit and charge on the customer's terms, offering prepay and now-pay options as well as traditional postpaid invoicing.

Figure 6:
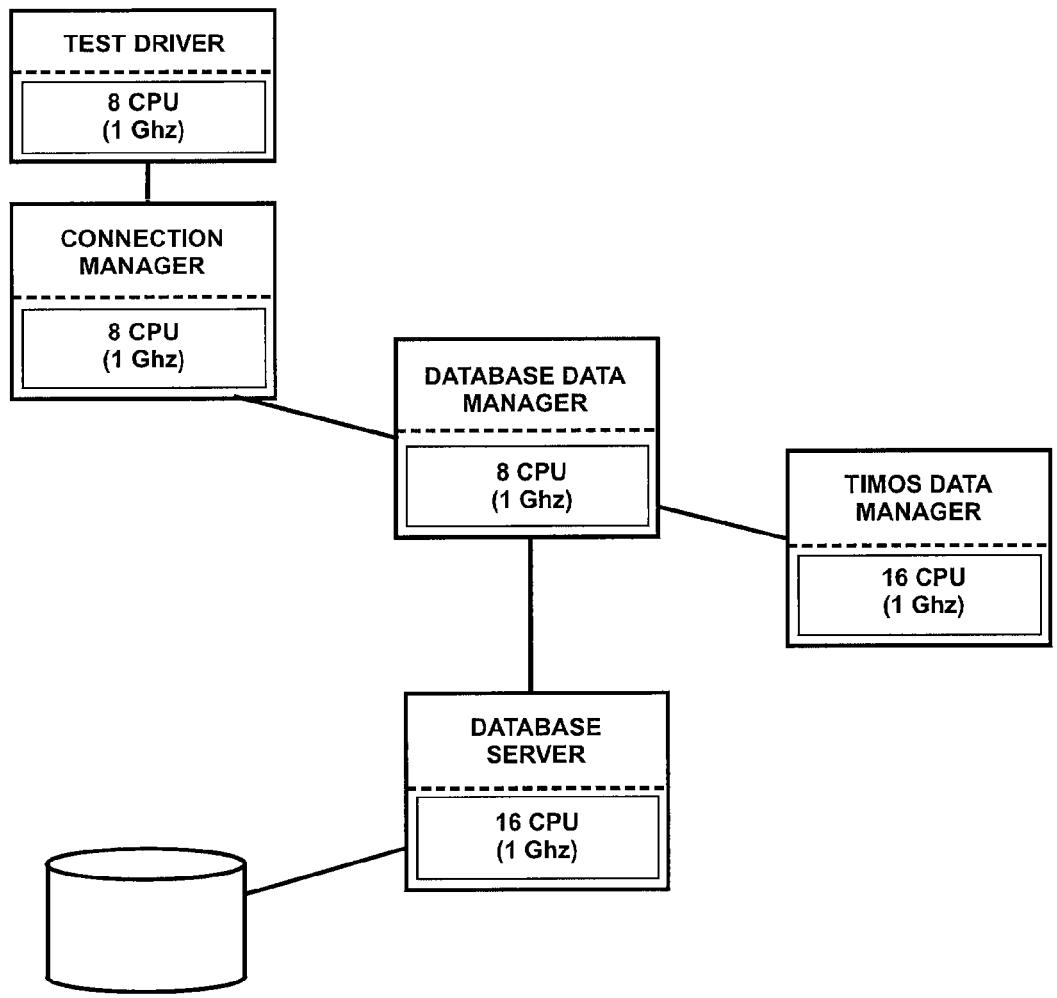
FIG. 6 illustrates the set-up for benchmark testing of the revenue management system.

FIG. 6 illustrates the configuration for a benchmarking test for the revenue management system. The test was conducted at Hewlett-Packard's laboratory in Cupertino, Calif. The test was performed on a single HP Superdome computer with 72 1-GHz CPUs partitioned into multiple domains. Test driver software running on an 8-CPU partition simulated an authentic traffic load (1.5 million prepaid subscribers) through the revenue management system. The Connection Manager and Database Data Manager each also ran on 8-CPU partitions, whereas a single instance of the transaction in-memory object store (TIMOS) data manager ran on a 16-CPU partition. An Oracle RDBMS ran on another 16-CPU partition.

TABLE 2

| Sessions per second | Operations per second | Average authorization latency (ms) | Sessions per second per CPU |
|---|---|---|---|
| 179 | 494 | 34 | 9.0 |

Table 2 illustrates the benchmark test results. A session represents a user's access to the network from beginning to end. In the case of a prepaid voice call, for example, the session begins when, following authorization of the caller's payment, a callee answers the call. This session ends when the caller hangs up. In the case of, for example, a prepaid SMS message, the session, likely much shorter, begins immediately after payment authorization and ends once the message has been transmitted across the network.

Each session may comprise multiple operations. A prepaid voice call, for instance, typically comprises three operations: service authorization and, if granted, start accounting and stop accounting operations. A prepaid call may cause operations within the system, for example, for reauthorization and reservation of more minutes on the network in the case of long call durations. SMS messages generally require just two operations per message: authorization and stop accounting.

The system under test supported as many as 179 concurrent sessions per second—equivalent to 9.0 sessions per second per CPU—and 494 operations per second. Moreover, because the system is linearly scalable, the establishment of additional TIMOS instances and the inclusion of more CPUs can provide a proportionate performance increase to meet any conceivable load demand at five-nines service availability.

A scaled-up version of the benchmark test system can support tens of millions of subscribers. The average authorization latency in the benchmark test results is 34 milliseconds (i.e., a substantially instantaneous response).

It is apparent to one skilled in the art that various changes and modifications can be made to this disclosure, and equivalents employed, without departing from the spirit and scope of the invention. Elements shown with any embodiment are exemplary for the specific embodiment and can be used on other embodiments within this disclosure.

We claim:

1. A system comprising:
    a processor; and
    a memory coupled with and readable by the processor and having stored therein a sequence of instructions which, when executed by the processor, cause the processor to implement a revenue management system for a communications network, the revenue management system including a gateway layer coupled with the communications network, a revenue capture layer communicatively coupled with the gateway layer, and a database and storage layer communicatively coupled with the revenue capture layer,
    wherein the gateway layer:
        receives a request related to a communication on the communications network,
        performs authentication of the request and authorization for services to support the communication based on the request,
        converts the request to an event data record, and
        forwards the event data record based on the services authorized and a type of the request, and
    wherein the revenue capture layer includes a transactional in-memory object store including a read-only reference object cache of data objects from the database and storage layer, wherein the revenue capture layer:
        receives the event data record from the gateway layer, and
        routes the event data record to the transactional in-memory object store or the database and storage layer depending upon the type of the request and a configurable directory server consulted, wherein routing the event data record comprises routing real-time requests to the transactional in-memory object store and routing non-real-time requests to the database and storage layer.

2. The system of claim 1, wherein the transactional in-memory object store includes a reference object cache of database objects from the database and storage layer.

3. The system of claim 2, wherein the reference object cache comprises customer account records used for read-only reference during real-time processes.

4. The system of claim 3, wherein the request related to the communication on the communications network comprises an authentication and authorization request and the real-time processes comprise authentication and authorization processes.

5. The system of claim 1, wherein the transactional in-memory object store includes a data migratory object and wherein the data migratory object fills the reference object cache from a database of the database and storage layer.

6. The system of claim 1, wherein the transactional in-memory object store includes a transient object store and wherein the transient object store includes temporary objects used only by the transactional in-memory object store.

7. The system of claim 6, wherein the temporary objects include active-session objects.

8. The system of claim 7, wherein the temporary objects further include resource-reservation objects.

9. A method for managing revenue from services of a communication network, the method comprising:
    receiving at a gateway layer of a revenue management system a request related to a communication on the communications network;
    performing by the gateway layer of the revenue management system authentication of the request and authorization for services to support the communication based on the request;

converting the request to an event data record by the gateway layer of the revenue management system;

forwarding the event data record from the gateway layer of the revenue management system based on the services authorized and a type of the request;

receiving the event data record at a transactional in-memory object store from the gateway layer, wherein a revenue capture layer includes the transactional in-memory object store including a read-only reference object cache of data objects from the database and storage layer; and routing the event data record to the transactional in-memory object store or the database and storage layer by the transactional in-memory object store by the revenue capture layer depending upon the type of the request and a configurable directory server consulted, wherein routing the event data record comprises routing real-time requests to the transactional in-memory object store and routing non-real-time requests to the database and storage layer.

10. The method of claim 9, wherein the transactional in-memory object store includes a reference object cache of database objects from the database and storage layer.

11. The method of claim 10, wherein the reference object cache comprises customer account records used for read-only reference during real-time processes.

12. The method of claim 11, wherein the request related to the communication on the communications network comprises an authentication and authorization request and the real-time processes comprise authentication and authorization processes.

13. The method of claim 9, wherein the transactional in-memory object store includes a data migratory object and wherein the data migratory object fills the reference object cache from a database of the database and storage layer.

14. The method of claim 9, wherein the transactional in-memory object store includes a transient object store and wherein the transient object store includes temporary objects used only by the transactional in-memory object store.

15. The method of claim 14, wherein the temporary objects include active-session objects.

16. The method of claim 15, wherein the temporary objects further include resource-reservation objects.

* * * * *

UNITED STATES PATENT AND TRADEMARK OFFICE
CERTIFICATE OF CORRECTION

PATENT NO. : 8,116,326 B2  
APPLICATION NO. : 11/478558  
DATED : February 14, 2012  
INVENTOR(S) : Rockel et al.

Page 1 of 1

It is certified that error appears in the above-identified patent and that said Letters Patent is hereby corrected as shown below:

On Title Page 3, item (56); in column 2, under "Other Publications", line 34, delete "Standasrds"," and insert -- Standards", --, therefor.

In column 1, line 8, after "and" delete "60/694,743," and insert -- 60/703,687, --, therefor.

In column 3, line 43-44, delete "telecommunication-network" and insert -- telecommunication network --, therefor.

Signed and Sealed this  
First Day of May, 2012

David J. Kappos  
*Director of the United States Patent and Trademark Office*